(12) United States Patent
Franke

(10) Patent No.: US 7,608,962 B2
(45) Date of Patent: Oct. 27, 2009

(54) ELECTRICAL MACHINE AND METHOD FOR SETTING THE FIELD AND ARMATURE OF A PERMANENTLY EXCITED ELECTRICAL MACHINE

(75) Inventor: Torsten Franke, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 11/868,020

(22) Filed: Oct. 5, 2007

(65) Prior Publication Data

US 2008/0036322 A1 Feb. 14, 2008

Related U.S. Application Data

(63) Continuation of application No. PCT/EP2006/002109, filed on Mar. 8, 2006.

(30) Foreign Application Priority Data

Apr. 6, 2005 (DE) .................... 10 2005 015 657

(51) Int. Cl.
*H02K 16/00* (2006.01)
(52) U.S. Cl. ........................ 310/114; 310/209
(58) Field of Classification Search ......... 310/112–114, 310/191, 209
See application file for complete search history.

(56) References Cited

U.S. PATENT DOCUMENTS

| | | | | |
|---|---|---|---|---|
| 3,713,015 A | * | 1/1973 | Frister | 322/28 |
| 4,187,441 A | * | 2/1980 | Oney | 310/112 |
| 4,879,484 A | | 11/1989 | Huss | |
| 5,260,642 A | | 11/1993 | Huss | |
| 6,388,353 B1 | * | 5/2002 | Liu et al. | 310/156.09 |
| 6,555,941 B1 | * | 4/2003 | Zepp et al. | 310/191 |

(Continued)

FOREIGN PATENT DOCUMENTS

DE 2 231 590 1/1974

(Continued)

OTHER PUBLICATIONS

International Search Report dated May 29, 2006 with an English translation of the pertinent portions (Six (6) pages).

(Continued)

*Primary Examiner*—Dang D Le
(74) *Attorney, Agent, or Firm*—Crowell & Moring LLP

(57) ABSTRACT

Electrical machine, having a stator which bears a winding and having a rotatable rotor, situated at a distance from the stator via an air gap, which includes at least two coaxial rotor sections which are rotatable relative to one another, in which each rotor section bears a system of permanent magnets having polarities which alternately point outward radially, and having an actuating device for rotating the rotor sections relative to one another, the actuating device having a controllable actuator via which the rotor sections may be aligned with one another with a variable rotary offset which is independent of a rotational speed of the rotor. In a method for setting the field and armature of a permanently energized electrical machine for motor vehicles, the rotational speed range of the electrical machine is divided into an armature-setting range, and a freely preselected field suppression is associated with a particular rotational speed of the rotor.

15 Claims, 3 Drawing Sheets

U.S. PATENT DOCUMENTS 6,771,000 B2 * 8/2004 Kim et al. .................. 310/209

FOREIGN PATENT DOCUMENTS

| DE | 3401 163 A1 | 11/1984 |
| DE | 3800916 A1 | 7/1989 |
| DE | 42 12 906 A1 | 10/1993 |
| EP | 1 237 259 A2 | 9/2002 |
| FR | 2 831 345 A1 | 4/2003 |
| GB | 2 266 197 A | 10/1993 |
| JP | 2000-201461 A | 7/2000 |

OTHER PUBLICATIONS

German Search Report dated Jun. 2, 2006 with an English translation of the pertinent portions (Nine (9) pages).

* cited by examiner

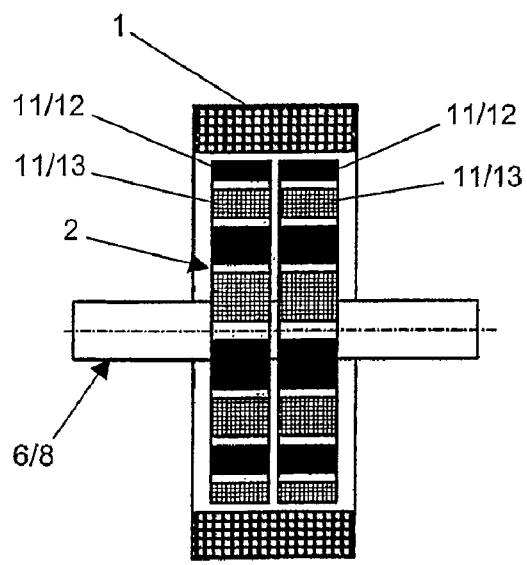
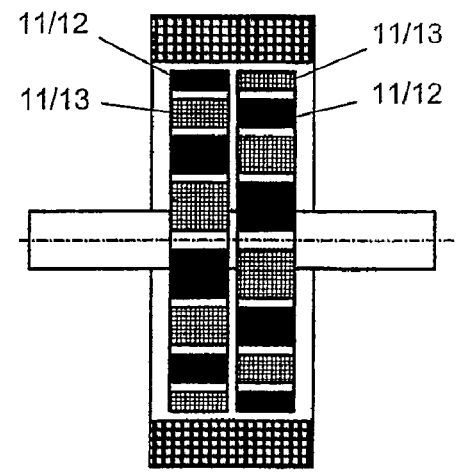
Fig. 2a      Fig. 2b
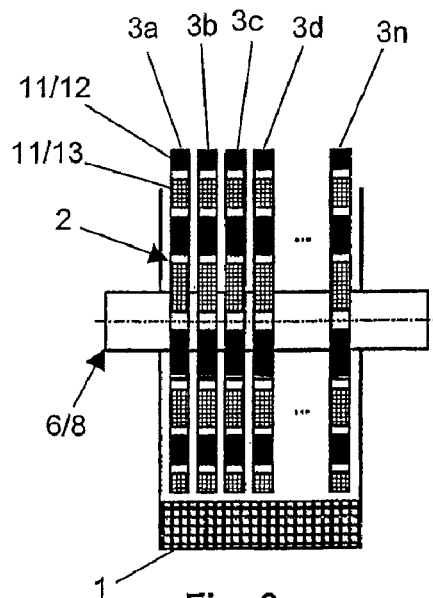
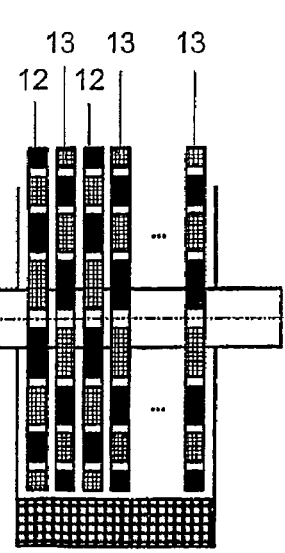
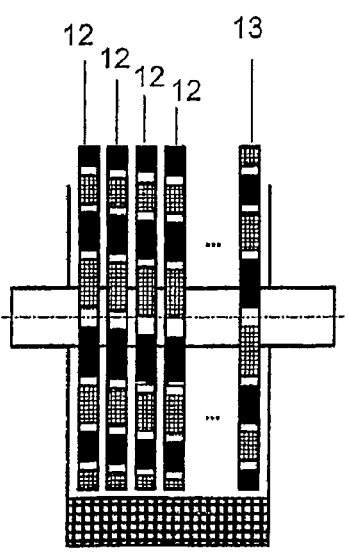
Fig. 3a      Fig. 3b      Fig. 3c

US 7,608,962 B2

ELECTRICAL MACHINE AND METHOD FOR SETTING THE FIELD AND ARMATURE OF A PERMANENTLY EXCITED ELECTRICAL MACHINE

CROSS REFERENCE TO RELATED APPLICATIONS

This application is a continuation of PCT International Application No. PCT/EP2006/002109, filed Mar. 8, 2006, which claims priority under 35 U.S.C. §119 to German Patent Application No. 10 2005 015 657.6, filed Apr. 6, 2005, the entire disclosures of which are herein expressly incorporated by reference.

BACKGROUND AND SUMMARY OF THE INVENTION

The present invention relates to an electrical machine having a stator which bears a winding and having a rotatable rotor, situated at a distance from the stator by means of an air gap, which is essentially composed of at least two coaxial rotor sections which are rotatable relative to one another, in which each rotor section bears a system of permanent magnets having polarities which alternately point outward radially, and having an actuating device for rotating the rotor sections relative to one another.

The present invention further relates to a method for setting the field and armature of a permanently energized electrical machine, in particular for motor vehicles, whose rotational speed range is divided into an armature-setting range and a field-setting range, having a rotor which has at least two rotor sections which are rotatable relative to one another, each having a system of permanent magnets having polarities which alternately point outward radially.

In automotive manufacturing, in addition to direct current motors and reluctance motors having an asynchronous design (short-circuit rotor), electric motors having a synchronous design (claw pole machine, permanently energized machine) are used. The specific choice depends on the particular application in which specific advantages of the particular type of design may be utilized. It is noted in particular that the electrical machine coupled to the drive train must cover a wide rotational speed range.

The rotational speed-torque characteristic curve of an electrical machine is critical for its operating response. A distinction is usually made between two rotational speed ranges, an armature-setting range (base rotational speed range) having a constant maximum torque, and a field-setting range (upper rotational speed range, also referred to as the field suppression range for induction machines) ideally having constant maximum electrical power. The rotational speeds which are possible or permissible as a function of the particular operating parameters of the electrical machine are set by the field setting or armature setting. In the armature setting range, the rotational speed is usually set by means of the armature setting via the armature voltage, and for setting higher rotational speeds a field setting (field suppression) is provided in the field setting range.

In particular in the development of hybrid or electric vehicles, as well as for generators (i.e., starter generators) of motor vehicles, good field setting capability is an important criterion for selecting an electrical machine. Optimal operation in the field setting range is of the greatest interest for operation of a generator. For this reason, for the wide rotational speed distribution of approximately 6000 1/min required in an internal combustion engine, the claw pole machine or the asynchronous machine is frequently used, since both have a broad useful field setting range.

In the claw pole machine, the field is provided directly via the energizing winding located on the rotor; this type of field setting is very efficient, and therefore the maximum available machine power in the field setting range hardly decreases with increasing rotational speed. However, the field setting of the claw pole machine is associated with a magnetic circuit—formed from the closed field lines, i.e., the closed magnetic flux and the components of the machine (electrical leads, magnets, ferromagnetic components, generally coated electric sheet steel), including the bridging of the air gap between the stator and rotor—which is not well utilized, for which reason the claw pole machine is not advantageous for higher power.

In the asynchronous machine, the power for the energizing field is impressed directly via the stator, and the field setting is provided indirectly via a setting of the phase angle (the angle between the magnetic and electrical field vectors) of the voltage impressed in the stator of the motor. The field setting of the asynchronous machine therefore suffers from significant losses, causing the maximum available machine power to decrease more or less strongly (depending on the design) with increasing rotational speed. This has an unfavorable effect on the operating response.

In a comparison of the claw pole machine with the asynchronous machine, the latter is characterized by better utilization of the magnetic circuit and greater robustness. Therefore, both systems are competitive for low-power applications. For higher-power applications, the better utilization of the magnetic circuit is the deciding factor in favor of using the asynchronous machine.

Permanent asynchronous machines, in contrast, are characterized by better efficiency, and therefore are likewise favored for these applications.

For known permanently energized synchronous machines, the field setting is made externally, i.e., indirectly via the stator. This is achieved, for example, in the same way as for the asynchronous machines, indirectly via the phase angle of the voltage impressed in the stator of the motor.

A disadvantageous effect, however, is that, compared to the asynchronous machine, an opposing field is generated by the stator which compensates for the rotor field. The efficiency of the field setting is therefore relatively low. This causes the maximum available machine power in the field setting range to drop steeply. The field setting range is therefore very small, and the usable rotational speed range generally extends only over the region that is twice the so-called transition speed (which is frequently equal to the nominal speed) of the machine. In addition, problems may arise in the "compensating" or "active" field suppression. If an error occurs within the engine/generator control system, it is possible that the field suppression is no longer maintained.

The following two error cases may be described: First, the voltage induced by the rotor occurs instantaneously at the terminals of the machine, and is limited only by the load state of an intermediate circuit capacitor. The energy content of the load is thus delivered to the intermediate circuit until the intermediate circuit voltage matches the no-load terminal voltage of the machine. For load configurations with a driven internal combustion engine or shifting load (for example, a vehicle in motion), the size of the intermediate circuit may not be large enough to absorb all of the energy until voltage equilibrium is established between a converter and the machine. Second, for a serious error within the engine control system (converter or terminal short circuit), the continued energizing of the stator circuit by the rotor causes a short-circuit torque. This acts as a braking torque on the rotating rotors and the engine mechanically coupled thereto. Such a response is undesirable for automotive applications. For a rigid coupling of the electrical machine to the drive train, this uncontrolled torque has an influence on the longitudinal dynamics of the vehicle. In extreme cases, limitation of control over the vehicle is a possibility.

A brushless motor is known from Japanese patent document JP 2000 201 461 A, including a stator having a winding, and a rotor having permanent magnets, the rotor being formed from two cylindrical, coaxially aligned sections, each having a ferromagnetic rotor core. Each of the two rotor sections is designed as a system of permanent magnets whose poles point outward in the rotational direction with alternating polarities. The first rotor section is connected to a rotational axis in a rotationally fixed manner, and the second rotor section is mounted so as to be rotatable relative to the first rotor section.

For changing the rotary offset of the two rotor sections with respect to one another, a mechanism is provided which acts independently of the rotational speed of the rotor. The rotating mechanism is based on a force effect on the second rotor section which depends on centrifugal force. For this purpose, circular arc-shaped grooves are provided in the radial direction in the rotor core in this rotor section which engage with the movable auxiliary axles. The auxiliary axles are supported by a fixing plate which is attached to the rotational axis and is provided with the corresponding slotted holes. On the side of the fixing plate facing away from the rotor, the ends of the auxiliary axles are connected to radial circular arc-shaped articulated elements which are held together by means of a spring system, so that the springs hold the auxiliary axles in position.

At low rotor rotational speeds the auxiliary axles are held in their starting position, and at increasingly higher rotational speeds the auxiliary axles move radially into the slots from the outside due to centrifugal force and cause rotation of the movable second rotor section which is coupled to the auxiliary axles and the springs. Depending on the particular relative position of the magnetic poles of the two rotor sections, the magnetic flux is altered in the stator winding of the motor. At low rotational speeds the identical polarities of the rotor sections are aligned with one another, so that the flux intensity in the poles of the stator is at a maximum, and at increasing rotational speeds the rotation of the movable rotor section increases, resulting in increasing suppression of the flux. As a result, the motor has a high torque not only at low rotational speeds, the same as in conventional motors, but may also be operated with relatively high torque and at high efficiency at high rotational speeds as well.

A disadvantage of the known motor is that the rotation of the movable second rotor section relative to the first rotor section is coupled to the rotational speed of the rotor shaft. The rotation in particular is proportional to the rotational speed of the shaft. The absolute magnitude of the displacement is fixedly specified by the spring mechanism and cannot be changed without great effort. The possibilities for suppressing the flux or the field setting are therefore relatively inflexible. In particular, the possibilities for achieving a field suppression characteristic of the machine along a given characteristic curve are limited.

A permanently energized electrical machine is known from German patent documents DE 34 01 163 C2 and DE 38 00 916 A1 in which the rotor includes a system of permanent magnets, each magnet being enclosed by a lamellar soft iron casing alternately composed of magnetically conductive and nonconductive layers. The magnetic field which acts in the air gap between the rotor and the stator extends in the rotor through the lamellar soft iron system and forms a magnetic circuit. The field setting may be achieved, for example, via the armature current, but with the disadvantages described above. For applications in which it is not necessary to rapidly alter the magnetic field, DE 34 01 163 C2 proposes a displaceable soft iron element in the rotor, which when displaced causes the magnetic circuit to increase in size, thereby suppressing the air gap field. The magnetic field may be actuated in this manner.

It is disadvantageous that the displaceable soft iron actuating element has a relatively complex structure, and is appropriate only for certain designs. In particular for a rotating machine, complicated design measures are necessary for installing and actuating the displaceable actuating elements. In addition, the possibilities for field suppression by the soft iron actuating element are limited. In particular for electrical machines rotating at high rotational speeds with the widest possible field setting region, as required in the automotive field, the known system is thus unsuitable.

An object of the present invention, therefore, is to provide an electrical machine having the design of a permanently energized synchronous machine which combines a wide field setting or field suppression range with a high field setting efficiency and improved field suppression variability, and ensures a higher level of operational reliability.

This and other objects and advantages are achieved by exemplary embodiments of the electrical machine in accordance with the present invention, in which an actuating device has a controllable actuator via which the rotor sections may be aligned with one another with a variable rotary offset which is independent of a rotational speed of the rotor.

According to the invention, a permanently energized machine is provided in which the field setting in the rotor itself is possible as a result of an externally actuatable rotary offset of two or more mutually rotatable rotor sections. The invention is also applicable to direct current machines as well as induction machines having any given number of winding phases and poles. In addition, the interconnected circuitry of individual coils (stator windings) has no effect on the function according to the invention. For the functioning of the electrical machine according to the invention, it is irrelevant whether the machine is designed as an internal rotor, external rotor, or disk rotor motor. The magnetic return of the rotor circuit likewise corresponds to the conventional machines. Furthermore, the step size of the stator winding is not critical for the function. The principle may be applied to hoop windings, chorded windings, concentrated windings, etc. In particular, the field setting in the rotor is not coupled to the rotational speed of the rotor.

The rotary offset of the rotor sections may be freely adjusted via the actuating device; i.e., the rotary offset, in the field setting range as well, does not necessarily change (proportionately) with the rotational speed of the machine, so that fine adjustment of a specified field suppression characteristic is possible over the entire rotational speed range of the electrical machine. The instantaneous torque is used as a parameter for the instantaneous rotary offset, although the change in rotary offset as a function of rotational speed may be any given specifiable function which is achieved via a corresponding control of the actuating device and the actuator.

According to the invention, use is made of the fact that the voltage induced by the rotor in the stator depends not on the maximum induction of the machine, but, rather, on the total induction acting on the winding of the stator. Thus, if a conductor loop (referred to below as a coil) is moved by two equally strong but opposing magnetic fluxes (which may be generated, for example, by two permanent magnets of opposite polarity), the resulting measurable voltage in the coils is zero (superposition principle). Thus, with regard to the induced voltage, it is not important whether the fields cancel one another at each location, or whether in places fields which are different from zero exist which ultimately cancel one another entirely. To prevent induction of a voltage in the coil, it is necessary only for the integral of the time-variable flux over the coil cross section to be zero.

For the electrical machine according to the invention, the permanent magnets of the rotor are mounted on at least two rotor sections which are rotatable relative to one another. The resulting field is altered by rotation of the rotor sections. In particular, this allows the field suppression to be regulated. The known disadvantages of the conventional permanently energized synchronous machines with regard to the field setting range and control of the torque for serious errors in the control system are avoided. The machine according to the invention thus combines the respective advantages of the electrically energized machines (e.g., claw pole machine, asynchronous machine) with regard to the field setting capability and utilization of the magnetic circuit with the advantages of the permanently energized machines with regard to their relatively simple and economical design and high efficiency. Compared to the rigid coupling of the rotary offset of the rotor sections to the machine rotational speed, the free field setting in the rotor allows more flexible options for operating the electrical machine.

In detail, the following advantages are realized: The field setting range may be extended much more widely over the rotational speed. The field suppression is achieved without losses, since it need not be impressed via the stator. No impairment of the phase angle is associated with the field setting, resulting in lower reactive power requirements for the machine. The control of the machine no longer need be designed for the reactive power requirements for the field setting, but, rather, only for the maximum actual power requirements. This results in advantages with regard to installation space and costs. In the case of generator operation, the type of field setting according to the invention ensures simpler operation with constant machine voltage that is independent of the rotational speed. The machine is therefore particularly suited for use in vehicles in which a virtually constant feed from the generator to the vehicle electrical system is required over a wide rotational speed range of the internal combustion engine. Machines which are well controllable and free of stop torque may be realized without limitations with regard to efficiency and maximum achievable torque.

When the machine is in no-load mode the field may be set to zero, thus allowing the machine to operate at any given rotational speed with essentially no losses. In the event of control errors the excitation may be reduced to zero in a short time (milliseconds), thus causing the torque applied by the machine to become zero as well. The machine according to the invention is therefore particularly suited for a rigid coupling to the drive train. The undesired short-circuit torque and its effect on the stability of the vehicle is avoided by use of the system according to the invention. It is not necessary for the excitation field to be generated via electrical paths, and in contrast to electrically energized machines no excitation power must be provided. The outlays for the excitation (power supply and circuitry for providing the excitation power) are lower, and the reactive power requirement is lower. This results in a more favorable load characteristic curve (better "cos φ"). The efficiency as well as the achievable power density are also higher. The utilization of the magnetic circuit is greater, and the achievable efficiency and power density are higher. The weight and volume are lower than for other electrical machines of the same functionality and power. Due to the optimized operation, the costs for a feeding converter are lower than for other electrical machines of the same functionality and power.

According to one exemplary embodiment of the invention, the rotor sections are provided on shaft sections of a main shaft designed as a hollow shaft, in which an inner shaft is supported in an axially displaceable manner. The actuator is designed as a displacement element for axial displacement of the inner shaft which, in mechanical linkage with the mutually engaged guide situated on the shafts, provides a freely selectable rotation and alignment of the rotor sections with respect to one another.

For simplicity of illustration, the following description relates to two rotor sections which are movable relative to one another, but correspondingly applies for a plurality of sections which are movable relative to one another.

According to the invention, the adjustment of the two segments relative to one another is performed in such a way that, for example, one rotor section is rigidly connected to the main shaft, and the other section is mounted so as to be rotatable relative to the main shaft. The inner shaft is positioned in the axial direction by means of a suitable adjustment aid, such as a mechanical guide prong or a hydraulically actuated piston. The positioning is then adjusted by a controlled electrical actuator, for example, or by means of the fluid pressure of a vehicle transmission. Besides these very flexible adjustment options which are independent of the rotational speed, actuation is also possible via a centrifugal force regulator, by means of which relative adjustment of the rotor sections directly conforms to the rotational speed of the rotor or the main shaft, and outside intervention is unnecessary.

The inner shaft is provided in places with guide grooves in which matching guide elements or guide catches of the outer shaft engage. The guide grooves in the sections for the rotor section which is rigidly connected to the shaft and for the rotor section which is connected to the shaft in a rotational manner may have different slopes. The guide grooves of one of the two sections may have an axially extending design, and the guide grooves of the other section may have a helically extending design.

According to another exemplary embodiment of the invention, both sections have opposing slopes. In this configuration the changes in rotational speed which occur during adjustment of the rotor sections cancel one another, resulting in response of the overall system which is advantageous from an energy and control standpoint.

According to another exemplary embodiment of the invention, both rotor sections are supported so as to be rotatable relative to the main shaft, and the guide grooves of the axially displaceable shaft have a third section which fixes a rotational alignment of the axially displaceable shaft with respect to the main shaft. In conjunction with the opposing slopes for the two rotor sections, the torques to be applied for adjusting the rotor sections also cancel one another relative to the main shaft, thus further improving the control response of the system.

According to another exemplary embodiment of the invention, the slope of the guide grooves is not constant within a section, thereby optimizing, for example, the force necessary for the adjustment and the setting range from an energy and control standpoint. In particular, the slope may decrease in a specific ratio with increasing offset of the rotor sections relative to one another. The progression of the slope is provided depending on the design of the machine and corresponding to the available torques in the rotational speed range. As a result of the variable slope, the force required for the adjustment may be minimized for the entire working region of the electrical machine.

According to another exemplary embodiment of the invention, the (two) differently configured guide grooves overlap one another. It is important that the non-intersected length of the guide grooves is sufficiently greater than the width of the guide grooves in order to avoid jamming of the guide elements (guide catches) or replacement of the guide track. A particularly compact system for the adjustment is achieved by overlapping the guide grooves.

According to another exemplary embodiment of the invention, the (two) rotor sections are mutually supported by springs in such a way that compensation is made for the rotational forces which result from the magnetic field lines formed by switching of the stator circuit between the (two) rotor sections. In this manner the rotor sections may be adjusted with respect to one another with a minimal outlay of force and energy.

The force of the supporting springs may be dimensioned to be sufficiently less than the rotationally acting magnetic forces which result between the rotor sections. The relative position of the rotor sections therefore has a preferred state at maximum field suppression, and in the absence of control the machine automatically deenergizes. As a result, the machine is no longer able to apply an appreciable torque in the event of malfunction. The force of the supporting springs may also be dimensioned to be sufficiently greater than the rotationally acting magnetic forces which result between the rotor sections. The relative position of the rotor sections therefore has a preferred state at minimum field suppression, and in the absence of control the machine automatically assumes the state of maximum excitation. As a result, the machine is able to apply its maximum torque in the event of malfunction. The force of the springs may also be dimensioned in such a way that an average deflection of the two rotor sections, and thus an average field suppression, is established. Lastly, it is also possible to adjust the preferred position via springs which act axially on the axially displaceable shaft. Here as well, the described working points may be defined as preferred positions.

According to another exemplary embodiment of the invention, the stator is divided into more than two sections. In particular, the following two variants may be advantageously implemented:

The individual sections may be adjusted relative to one another with different offsets. First, the field suppression characteristic of the machine may be fixed on a specific characteristic curve in a particularly effective manner. Second, a "skewing" of the rotor may be varied in order to adapt stop torque and torque ripple to a specific working point of the machine. It is thus possible, for example, to provide a high stop torque for a stationary rotor in order to achieve, for example, a braking or clutch function for a currentless machine (the offset of the magnets, i.e., the skew of the rotor, is zero). The stop torque is reduced and canceled by the increasing offset of the magnets/increasing skewing of the rotor, thereby releasing the brake or clutch. This method may also be used to improve the control response of the machine for small torques without impairing the maximum torque of the machine as the result of a fixed skewing.

It is also possible to make a rigid mechanical interconnection with every other section, resulting in two rotor parts which are intermeshed in a comb-like manner. With a sufficiently fine division of the rotor, offsetting of the rotor sections suppresses not only the entire field which acts on the stator coils, but also the locally acting field as the result of disproportionately increasing edge effects (termination of flux between the magnets already in the air gap). In this manner the core losses, i.e., the additional energy outlay for the magnetic field for bridging the air gap between the stator and rotor in the form of increased excitation current, magnetic reversal, and turbulent flow losses, are further reduced in the stator.

According to another exemplary embodiment of the invention, the rotor sections are designed as intermeshed cups. The inner rotor section has a magnetic return, whereas the magnetic return is avoided for the outer rotor section. The outer rotor section may be designed as a self-supporting magnetic cup with alternating magnetization. To realize the return-free design, nonmagnetic materials, for example plastics or aluminum, may be used as supports for the individual permanent magnets. When magnetic support materials are used, dimensioning is possible which causes saturation of any magnetic short circuits which may occur. For this purpose, suitable materials or dimensioning guidelines for saturating magnetic bars are known as such from the design of electrical machines. The cup design according to the invention results in a localized compensation of the magnetic field, and therefore has the advantage of a further reduction of the core losses in the field setting range. In principle, a cup design having more than two intermeshing rotor sections is also possible.

The known methods for setting the field and armature of permanently energized electrical machines have the disadvantages described above.

A further object of the present invention, therefore, is to provide a method in which the field setting of a permanently energized synchronous machine is more efficient.

This object is achieved in accordance with the present invention by a method for setting the field and armature of a permanently energized electrical machine for motor vehicles having a rotational speed range divided into an armature-setting range and a field-setting range, by varying a rotary offset of the rotor sections via controllable actuator in such a way that a freely preselected field suppression is associated with a particular rotational speed of the rotor.

As a result of the freely variable field setting or field suppression in the rotor itself, more efficient and reliable operation of the permanently energized synchronous machine is achieved in a wide rotational speed range. By means of fine adjustment of the rotary offset, in operation the machine conserves energy with low power losses.

When the machine is operated in the armature setting range, the rotor sections may have in-phase alignment; i.e., the polarities of adjacent or oppositely situated magnets are identical, and the rotary offset relative to one another is zero. The machine may thus be operated with maximum excitation. In the field setting range, the rotor sections are rotated relative to one another so that the magnets are mutually offset and the polarities overlap. The resulting field is thus suppressed, and the voltage induced in the stator is correspondingly smaller. The machine may thus be operated above the so-called transition speed in the same manner as for externally impressed field suppression at rotational speeds, and the available torque is correspondingly reduced.

For a shift of the (two) rotor sections by exactly one pole division (out-of-phase alignment), the resulting field is zero, as well as the induced voltage resulting in the stator and the torque applied by the electrical machine. Uncontrolled torque may thus be avoided in the event of a serious control error.

Other objects, advantages and novel features of the present invention will become apparent from the following detailed description of the invention when considered in conjunction with the accompanying drawings.

BRIEF DESCRIPTION OF THE DRAWINGS

The drawings show the following:

FIG. 2a shows a schematic illustration of a rotational alignment of the two rotor sections at maximum excitation, in a sectional side view;

FIG. 2b shows a schematic illustration of a rotational alignment of the two rotor sections at maximum field suppression;

FIG. 3a shows a schematic illustration of a rotational alignment of a rotor having more than two rotor sections, at maximum excitation;

FIG. 3b shows a schematic illustration of a rotational alignment of the more than two rotor sections, at the resulting maximum field suppression;

FIG. 3c shows a schematic illustration of an alternative rotational alignment of the more than two rotor sections, at the resulting maximum field suppression;

DETAILED DESCRIPTION OF THE DRAWINGS

An electrical machine essentially includes a stator 1 and a rotor 2, which is divided into multiple rotor sections 3a-n which are rotatable relative to one another.

The electrical machine is designed as a permanently energized synchronous machine, for example in an internal pole (internal rotor machine) design. The structure and mode of functioning of such permanently energized synchronous machines are known in principle. Therefore, a detailed description is provided only for the rotor 2 according to the invention.

Figure 1B:
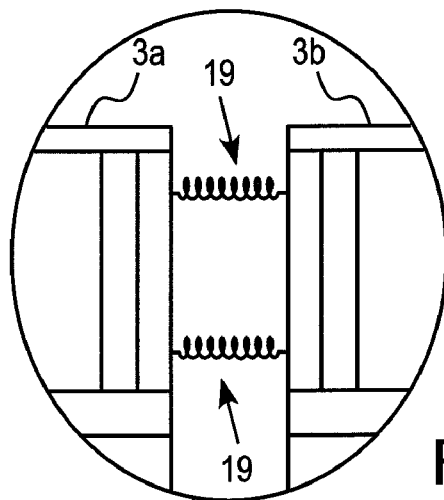
FIG. 1 shows a simplified illustration of an electrical machine having two rotor sections which are rotatable relative to one another, in a sectional side view.
Figure 1A:
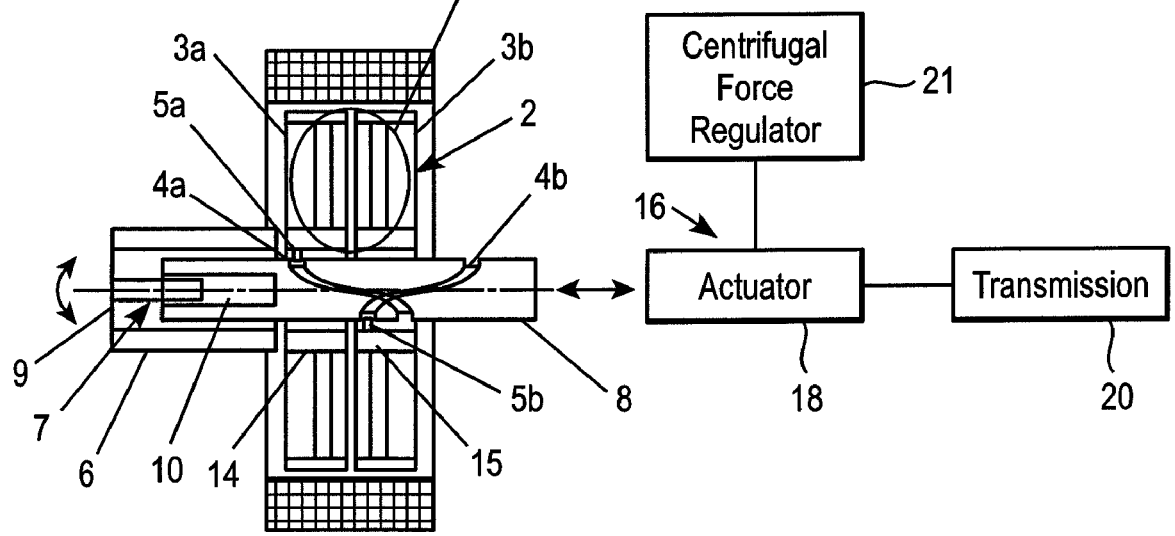

FIG. 1 shows the rotor 2 having two adjacently situated rotor sections 3a and 3b. The rotor 2 is situated at a distance from the stator 1 by means of an air gap, and is rotatably supported on a main shaft 6. The stator 1 is provided with coils and electric steel sheets in a known manner. The rotor sections 3a, 3b are designed as magnet wheels, each bearing a system of permanent magnets 11, the magnetic north pole 12 and south pole 13 alternately pointing outward (FIGS. 2a and 2b). The main shaft 6 is designed as a hollow shaft into which an inner shaft 8 projects. The shaft 8 is axially displaceable with respect to the shaft 6. A guide pin 9 on the main shaft 6 and a borehole 10 in the inner shaft 8 act as a guiding aid 7. An actuating device 16 is provided for adjusting the rotor sections 3a, 3b or 3a-n relative to one another.

The actuating device 16 has an actuator (not illustrated), for example a controllable electrical actuator, for axial displacement of the shaft 8. The actuator causes displacement of the shaft 8 along a displacement path which may be preselected by means of a control unit (not illustrated). The rotor sections 3a and 3b are provided on shaft sections 14, 15 of the main shaft 6 so as to be rotatable relative to one another. Provided on the shaft sections 14, 15 are guide elements/guide catches 5a, 5b which engage with helically extending guide grooves 4a, 4b on the inner shaft 8. An axial displacement of the inner shaft 8 occurs via the guide grooves 4a, 4b, and the guide catches 5a, 5b cause the rotor sections 3a, 3b to rotate relative to one another. Any given rotary offset of the poles 12, 13 of the rotor sections 3a, 3b may be set by means of the axial displacement of the inner shaft 8. In addition, springs (not illustrated) are advantageously provided between the rotor sections 3a, 3b which establish a preferred position of the rotor sections 3a, 3b.

Figure 4:
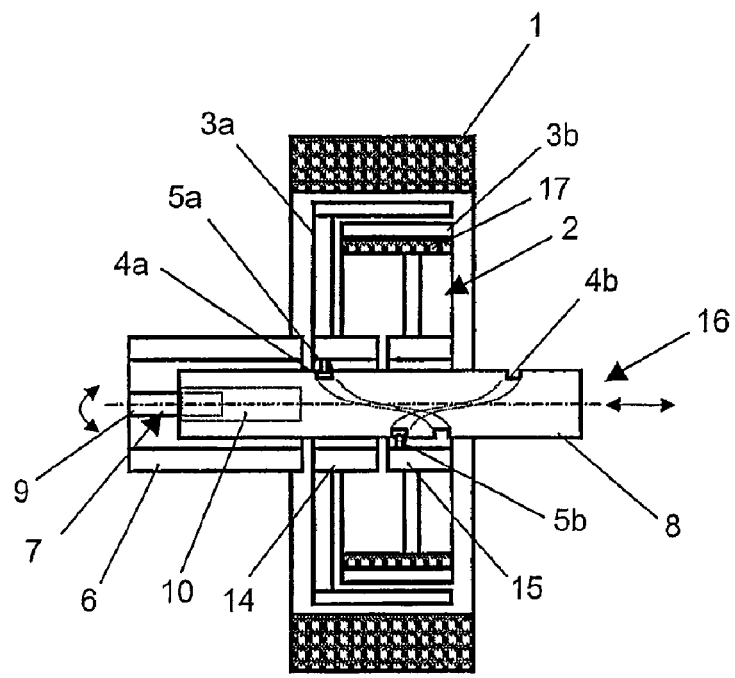
FIG. 4 shows a simplified illustration of an electrical machine having two intermeshing rotor sections which are rotatable relative to one another, in a sectional side view.

A further embodiment of the rotor 2 is illustrated in FIGS. 4 and 5. The rotor sections 3a, 3b are provided as intermeshed cups (similarly as for FIG. 1, the bearing, force-transmitting elements, and springs between the rotor sections are not illustrated). The outer rotor section 3a is designed as a self-supporting cup without magnetic return. At its inner periphery the inner rotor section 3b has a magnetic return 17. In other respects the mode of functioning corresponds to that of adjacently positioned rotor sections.

One method for setting the field and armature of a permanently energized electrical machine is based essentially on a rotational alignment of magnetic poles 12, 13 of rotor sections 3a-n, provided so as to be rotatable relative to one another, of a rotor 2 of the machine.

The method for the above-described electrical machine according to the invention is explained below for the case of an electric motor/generator, having a wide rotational speed range, coupled to the drive train of a motor vehicle.

The setting of the field or armature along a torque/rotational speed characteristic curve is provided according to the invention by varying the rotary offset between the rotor sections 3a, 3b (rotor having two rotor sections). In the base rotational speed range (armature setting range) the machine is to be operated at maximum excitation. The increase in electrical power at maximum drive torque (nominal torque) is approximately linear. In this regard, the rotor sections 3a, 3b have in-phase alignment; i.e., the polarities of adjacent magnets 11 are identical (the north pole 12 is adjacent to north pole 12, and the south pole 13 is adjacent to south pole 13), and the rotary offset relative to one another is zero (FIG. 2a). In order to allow operation of the machine at rotational speeds above the armature setting range, i.e., in the field setting range (field suppression range), suppression of the magnetic air gap field (field setting/field suppression), i.e., a reduction in the excitation, is necessary. The electrical power remains approximately at a maximum as the drive torque decreases. For this purpose, the two rotor sections 3a, 3b are rotated relative to one another so that the magnets are mutually offset. The resulting field is smaller for reduced voltage induction in the stator 1. A maximum field suppression results for out-of-phase alignment (the north pole 12 is adjacent to the south pole 13) of the rotor sections 3a+b (FIG. 2b). The field suppression or field setting may be varied by means of a rotary offset between the in-phase and the out-of-phase alignments.

For a rotor division having more than two rotor sections (FIGS. 3a-c), the individual rotor sections 3a-n are aligned for maximum excitation without rotary offset. For the field setting, the rotor sections 3a-n may be aligned relative to one another with different rotary offsets. Maximum field suppression results from an alternating alignment (north pole-south pole-north pole . . . ) (FIG. 3b), or from an increasing offset (north pole-north pole with rotary offset-south pole) of the individual rotor sections 3a-n (FIG. 3c). By means of a given rotary offset for each individual rotor section 3a-n it is possible to achieve a specific field suppression characteristic curve.

Figures 5A, 5B:
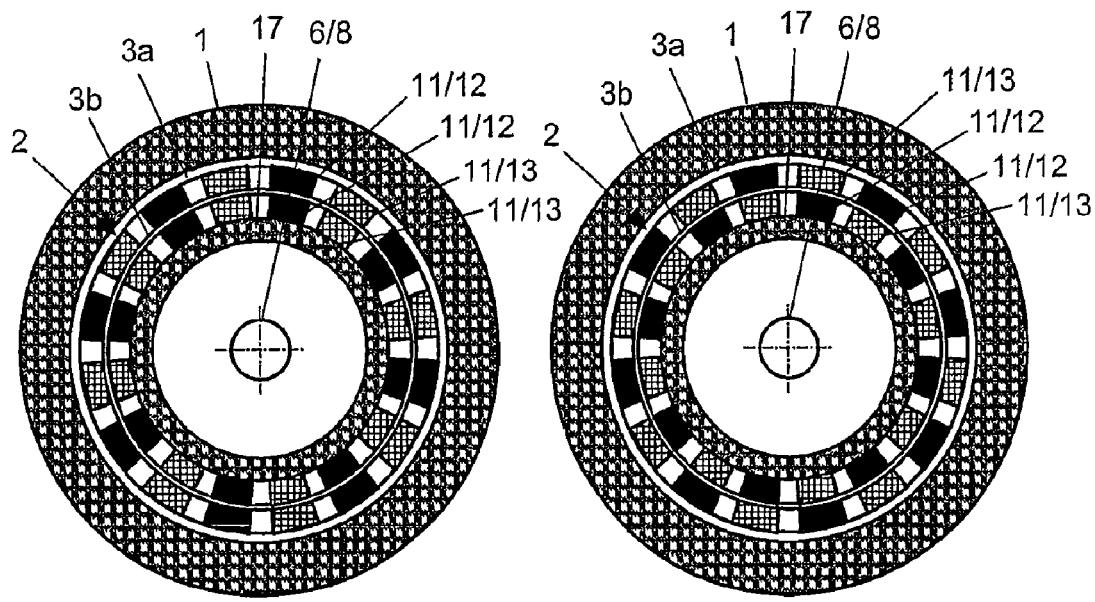
FIG. 5a shows a simplified illustration of a rotational alignment of the intermeshing rotor sections at maximum excitation, in a sectional front view.
FIG. 5b shows a simplified illustration of a rotational alignment of the intermeshing rotor sections at maximum field suppression.

In the case of a cup configuration as illustrated in FIG. 4 or 5, the magnetic poles 12 or 13 of the outer rotor section 3a and of the inner rotor section 3b are oppositely situated. At maximum excitation (armature setting range), the same polarities are situated opposite one another (FIG. 5a). For a rotary offset, the oppositely situated poles increasingly overlap (field setting range) until the opposing polarities are opposite one another (FIG. 5b). This setting in turn produces a maximum field suppression.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An electrical machine, comprising:
   a stator which bears a winding;
   a rotatable rotor, situated at a distance from the stator via an air gap, the rotor including at least two coaxial rotor sections which are rotatable relative to one another, in which each rotor section bears a system of permanent magnets having polarities which point outward radially in alternation; and
   an actuating device for rotating the rotor sections relative to one another;
   wherein the actuating device has a controllable actuator configured to align the rotor sections with one another with a variable rotary offset which is independent of a rotational speed of the rotor; and
   wherein the rotor sections are provided on shaft sections of a main shaft designed as a hollow shaft, in which an inner shaft is supported in an axially displaceable manner, and the actuator is designed as a displacement element for axial displacement of the inner shaft which, in mechanical linkage with a mutually engaged guide situated on the shafts, provides a freely selectable rotation and alignment of the rotor sections with respect to one another.

2. The electrical machine according to claim 1, wherein the first rotor section is rigidly connected to the main shaft, and the second rotor section is mounted so as to be rotatable relative to the main shaft.

3. The electrical machine according to claim 1, wherein the rotor sections are supported so as to be rotatable relative to the main shaft, and the inner shaft has a guide groove by means of which a rotational alignment of the axially displaceable inner shaft with respect to the outer main shaft may be fixed.

4. The electrical machine according to claim 1, wherein the rotor has more than two rotor sections which are rotatable relative to one another.

5. The electrical machine according to claim 4, wherein every other rotor section is rigidly connected to the other.

6. The electrical machine according to claim 1, wherein the actuator is designed as a hydraulic piston which may be actuated via the fluid pressure of a motor vehicle transmission.

7. The electrical machine according to claim 1, wherein the actuator is designed as an electrical actuator which acts on an adjustment aid provided on the inner shaft.

8. The electrical machine according to claim 1, wherein the actuator may be controlled via a centrifugal force regulator which conforms to the rotational speed of the main shaft of the rotor.

9. The electrical machine according to claim 1, wherein a guide at an inner shaft is designed as at least one of axially and helically extending guide grooves, and a guide at a main shaft is designed as a guide catch which engages with the guide grooves.

10. The electrical machine according to claim 9, wherein the guide grooves have different slopes in places.

11. The electrical machine according to claim 9, wherein the guide grooves are oppositely sloped in places.

12. The electrical machine according to claim 9, wherein the rate of slope of the guide grooves within a shaft section of the inner shaft is changeable.

13. The electrical machine according to claims 9, wherein the guide grooves provided with at least one of different slopes and progressions overlap one another.

14. The electrical machine according claim 1, wherein the rotor has spring elements that support the rotor sections relative to one another, and a preferred state of the rotational position of the rotor sections may be set by adapting the elastic force of the spring elements to the rotationally acting magnetic forces which occur between the rotor sections during operation.

15. The electrical machine according to claim 1, wherein the rotor sections are designed as intermeshed cups.

* * * * *